United States Patent
Chandler et al.

(10) Patent No.: US 9,970,388 B2
(45) Date of Patent: May 15, 2018

(54) TANDEM THRUST REVERSER WITH SLIDING RAILS

(71) Applicant: United Technologies Corporation, Farmington, CT (US)

(72) Inventors: Jesse M. Chandler, South Windsor, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/586,386

(22) Filed: May 4, 2017

(65) Prior Publication Data

US 2017/0234267 A1    Aug. 17, 2017

Related U.S. Application Data

(62) Division of application No. 14/184,335, filed on Feb. 19, 2014, now Pat. No. 9,670,876.

(60) Provisional application No. 61/768,160, filed on Feb. 22, 2013, provisional application No. 61/768,154, filed on Feb. 22, 2013, provisional application No. 61/768,166, filed on Feb. 22, 2013, provisional application No. 61/768,171, filed on Feb. 22, 2013, provisional application No. 61/768,172, filed on Feb. 22, 2013.

(51) Int. Cl.
| | |
|---|---|
| F02K 1/76 | (2006.01) |
| F02K 1/72 | (2006.01) |
| B64D 33/04 | (2006.01) |
| B64D 29/00 | (2006.01) |

(52) U.S. Cl.
CPC .............. *F02K 1/763* (2013.01); *B64D 29/00* (2013.01); *B64D 33/04* (2013.01); *F02K 1/72* (2013.01); *F05D 2260/50* (2013.01)

(58) Field of Classification Search
CPC ..... F02K 1/32; F02K 1/60; F02K 1/62; F02K 1/70; F02K 1/566
USPC ....................... 239/265.29, 265.37; 60/226.2
See application file for complete search history.

(56) References Cited

U.S. PATENT DOCUMENTS

| | | | |
|---|---|---|---|
| 2,282,552 | A | 5/1942 | Banowetz |
| 2,526,791 | A | 10/1950 | Wroblewski |
| 3,067,968 | A | 12/1962 | Heppenstall |
| 3,601,992 | A | 8/1971 | Maison |
| 3,614,037 | A | 10/1971 | Vdolek |
| 3,699,682 | A | 10/1972 | Kleckner |
| 4,196,856 | A | 4/1980 | James |
| 4,278,220 | A | 7/1981 | Johnston et al. |

(Continued)

FOREIGN PATENT DOCUMENTS

| | | |
|---|---|---|
| EP | 0515263 B1 | 8/1994 |
| EP | 0756078 A1 | 1/1997 |

(Continued)

OTHER PUBLICATIONS

Inernational Search Report and Written Opinion from PCT Application Serial No. PCT/US2014/022955, dated Dec. 17, 2014, 13 pages.

*Primary Examiner* — Timothy L Maust
(74) *Attorney, Agent, or Firm* — Kinney & Lange, P.A.

(57) ABSTRACT

A pivot thrust reverser includes a first tandem pivot door subassembly comprising an inner panel and an outer panel. The inner panel and outer panel are connected by a first sliding rail. A second tandem pivot door subassembly is included comprising an inner panel and an outer panel. The inner panel and outer panel are connected by a second sliding rail.

4 Claims, 6 Drawing Sheets

(56) References Cited

U.S. PATENT DOCUMENTS

| | | |
|---|---|---|
| 4,410,152 A | 10/1983 | Kennedy et al. |
| 4,442,987 A | 4/1984 | Legrand et al. |
| 4,485,970 A | 12/1984 | Fournier et al. |
| 4,825,644 A | 5/1989 | Bubello et al. |
| 4,894,985 A | 1/1990 | Dubois et al. |
| 4,920,744 A | 5/1990 | Garcia et al. |
| 4,960,243 A | 10/1990 | Dubois et al. |
| 5,039,171 A | 8/1991 | Lore |
| 5,090,197 A | 2/1992 | Dubois |
| 5,110,069 A | 5/1992 | Webb |
| 5,117,630 A | 6/1992 | Cariola et al. |
| 5,267,438 A | 12/1993 | Bunel et al. |
| 5,315,821 A | 5/1994 | Dunbar et al. |
| 5,497,961 A | 5/1996 | Newton |
| 5,609,313 A | 3/1997 | Cole et al. |
| 5,642,960 A | 7/1997 | Salice |
| 5,722,231 A | 3/1998 | Porte |
| 5,863,014 A | 1/1999 | Standish |
| 5,941,061 A | 8/1999 | Sherry et al. |
| 5,970,704 A | 10/1999 | Lardy et al. |
| 5,974,783 A | 11/1999 | Gonidec et al. |
| 6,079,201 A | 6/2000 | Jean |
| 6,151,884 A | 11/2000 | Gonidec et al. |
| 6,170,255 B1 | 1/2001 | Gonidec et al. |
| 6,179,249 B1 | 1/2001 | Canadas |
| 6,293,495 B1 | 9/2001 | Aten et al. |
| 6,340,135 B1 | 1/2002 | Barton |
| 6,568,172 B2 | 5/2003 | Jannetta et al. |
| 6,688,099 B2 | 2/2004 | Lair |
| 6,786,038 B2 | 9/2004 | Lair |
| 6,968,675 B2 | 11/2005 | Ramlaoui et al. |
| 7,127,880 B2 | 10/2006 | Lair et al. |
| 7,484,356 B1 | 2/2009 | Lair |
| 7,784,735 B2 | 8/2010 | Marche |
| 7,784,765 B2 | 8/2010 | Ichikawa et al. |
| 7,959,106 B2 | 6/2011 | Guibert et al. |
| 7,959,107 B2 | 6/2011 | Beaufort |
| 8,002,217 B2 | 8/2011 | Sternberger |
| 8,015,797 B2 | 9/2011 | Lair |
| 8,052,085 B2 | 11/2011 | Lair |
| 8,091,827 B2 | 1/2012 | Lair |
| 8,172,175 B2 | 5/2012 | Lair |
| 8,181,905 B2 | 5/2012 | McDonough et al. |
| 8,220,738 B2 | 7/2012 | Calder et al. |
| 8,226,027 B2 | 7/2012 | Journade et al. |
| 8,418,436 B2 | 4/2013 | Pero et al. |
| 8,951,006 B2 | 2/2015 | Vauchel et al. |
| 9,188,026 B2 | 11/2015 | Calder et al. |
| 2003/0218094 A1 | 11/2003 | Lair |
| 2005/0039438 A1 | 2/2005 | Lair |
| 2005/0084325 A1 | 4/2005 | O'Brien et al. |
| 2005/0151012 A1 | 7/2005 | Lair |
| 2006/0288688 A1 | 12/2006 | Lair |
| 2008/0072570 A1 | 3/2008 | Lair |
| 2008/0098720 A1 | 5/2008 | Watson |
| 2008/0302083 A1 | 12/2008 | Sloan et al. |
| 2009/0260344 A1 | 10/2009 | Hoyland |
| 2009/0288386 A1 | 11/2009 | Marshall et al. |
| 2009/0313969 A1 | 12/2009 | Lair et al. |
| 2010/0008772 A1 | 1/2010 | Vauchel et al. |
| 2010/0107599 A1 | 5/2010 | Vauchel |
| 2010/0139242 A1 | 6/2010 | Vauchel et al. |
| 2010/0170984 A1 | 7/2010 | Journade et al. |
| 2010/0270428 A1 | 10/2010 | Murphy |
| 2011/0101159 A1 | 5/2011 | Lair et al. |
| 2011/0167790 A1 | 7/2011 | Cloft et al. |
| 2011/0318173 A1 | 12/2011 | Ramlaoui et al. |
| 2012/0005999 A1 | 1/2012 | Pero et al. |
| 2012/0067024 A1 | 3/2012 | Vauchel |
| 2012/0067975 A1 | 3/2012 | Vauchel |
| 2012/0073263 A1 | 3/2012 | Kohlenberg et al. |
| 2012/0325930 A1 | 12/2012 | Pero et al. |
| 2013/0216297 A1 | 8/2013 | Albach |
| 2013/0219002 A1 | 8/2013 | Li et al. |
| 2014/0239083 A1 | 8/2014 | Suciu et al. |
| 2014/0239084 A1 | 8/2014 | Chandler et al. |
| 2015/0121839 A1 | 5/2015 | Chandler et al. |

FOREIGN PATENT DOCUMENTS

| | | |
|---|---|---|
| EP | 0756557 B1 | 5/1998 |
| EP | 0728934 B1 | 5/1999 |
| EP | 0761947 B1 | 5/2000 |
| EP | 0771945 B1 | 1/2001 |
| EP | 0789140 B1 | 11/2001 |
| EP | 0822327 B1 | 8/2003 |
| EP | 2399827 A2 | 12/2011 |
| EP | 1507971 B1 | 1/2012 |
| EP | 1676024 B1 | 10/2012 |
| WO | WO9528318 A1 | 10/1995 |
| WO | WO03100241 A1 | 12/2003 |
| WO | WO2007123556 A2 | 11/2007 |
| WO | WO2011014346 A2 | 2/2011 |

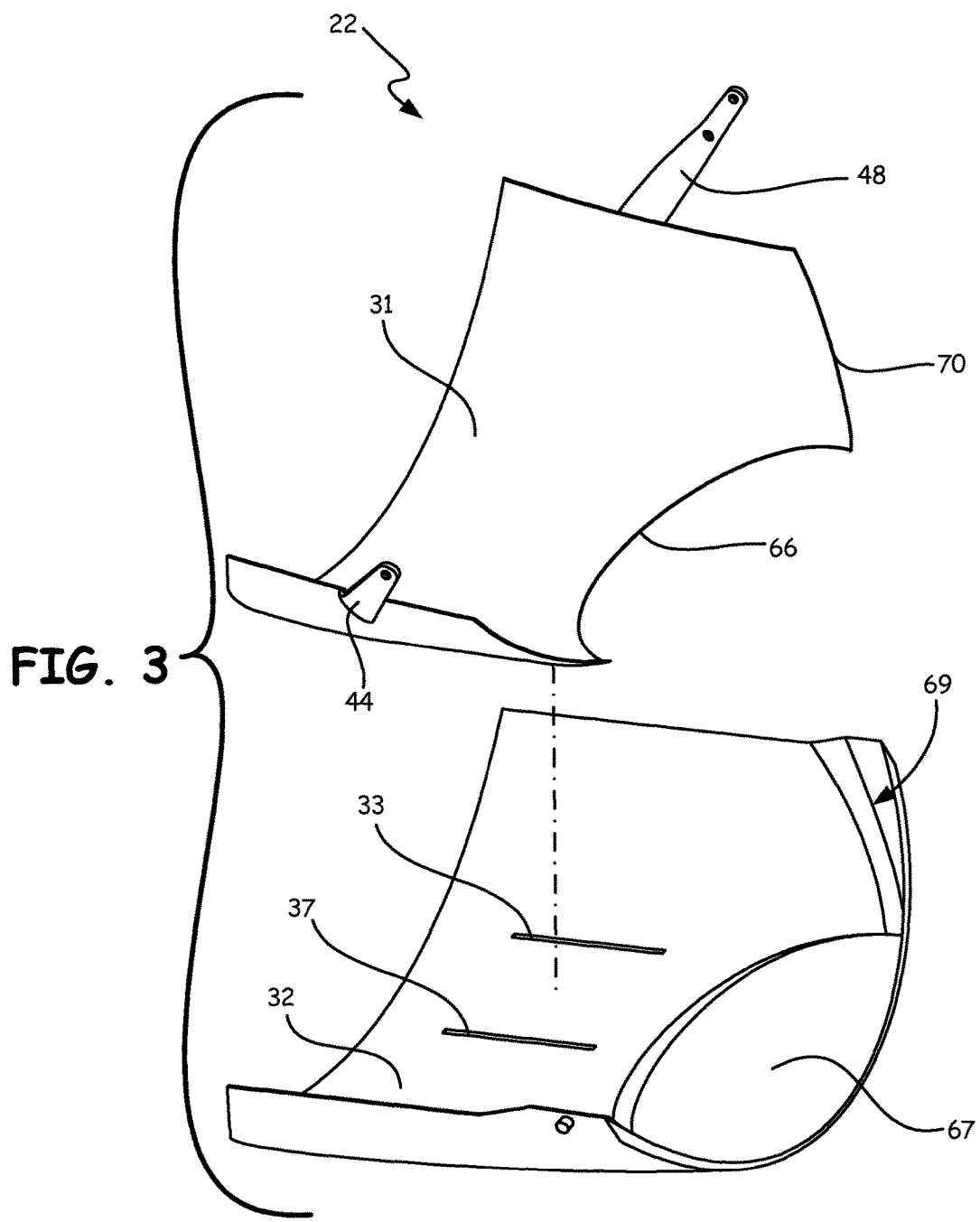

TANDEM THRUST REVERSER WITH SLIDING RAILS

CROSS-REFERENCE TO RELATED APPLICATION(S)

This application is a divisional of U.S. application Ser. No. 14/184,335 filed Feb. 19, 2014, for "TANDEM THRUST REVERSER WITH SLIDING RAILS" by J. Chandler and G. Suciu, which claims priority to U.S. Provisional Patent Application Ser. No. 61/768,160, entitled "ATR TANDEM THRUST REVERSER," filed Feb. 22, 2013, which is hereby incorporated by reference in its entirety. Priority is also claimed to U.S. Provisional Patent Applications Ser. Nos. 61/768,154, entitled "ATR PIVOT THRUST REVERSER WITH CONTOURING AROUND CORE," filed Feb. 22, 2013; 61/768,166, entitled "ATR TANDEM THRUST REVERSER WITH 4-BAR LINKAGE," filed Feb. 22, 2013; 61/768,171, entitled "ATR CONTOURED THRUST REVERSER WITH 3 POINT ACUATION," filed Feb. 22, 2013; and 61/768,172, entitled "AIR TANDEM THRUST REVERSER WITH 3 POINT ACTUATION," filed Feb. 22, 2013. All of these are hereby incorporated by reference in their entirety.

BACKGROUND

The presently disclosed embodiments relate generally to gas turbine engine and/or nacelle assemblies and, more particularly, to thrust reversers used in gas turbine engine and/or nacelle assemblies.

Thrust reversers in gas turbine engine and/or nacelle assemblies are deployed to redirect an aircraft's propulsive air flow, such as in a forward direction rather than aft. This can provide deceleration for the aircraft which, for example, can assist in slowing the aircraft down during landing, and therefore, enable shorter landing distances while reducing stress and wear on an aircraft's brakes. Thrust reversers are particularly useful when a landing surface is icy or wet, and consequently, the aircraft's brakes are less effective.

Commercial gas turbine engines typically include an engine which produces high temperature, high pressure exhaust ejected through a nozzle downstream of the engine, and a bypass duct, which is generally an annular space concentrically located about the engine through which air from the engine fan, known as the fan bypass stream, is passed. Many aircraft applications use high bypass ratio gas turbine engines, where a majority of the aircraft's propulsion is provided by the fan bypass stream, rather than by the exhaust produced from the engine. In such applications, a thrust reverser may be able to operate effectively by redirecting the fan bypass stream alone.

However, providing a thrust reverser to redirect the fan bypass stream presents design challenges. The thrust reverser must be part of an overall aerodynamic design when stowed, yet be capable of effectively deploying at an appropriate angle which captures enough of the fan bypass stream, and redirects this fan bypass stream at the needed angle, to provide deceleration. Achieving this can be complicated due to stationary portions of the nacelle, which can serve as an obstruction to the thrust reverser when attempting to move to the deployed position. To obtain thrust reverser designs which provide the necessary deceleration and avoid nacelle interference, complex assemblies with a multitude of parts have generally been used, often requiring translating parts relative to the engine to allow the thrust reverser to deploy at an effective location without nacelle interference. These designs also have generally included an obstruction present in the fan bypass stream reversal flow path, such as actuators or linkages. Moreover, these complex designs are less reliable and require greater maintenance costs. Even with these complex designs, significant portions of the fan bypass stream are not redirected, resulting in a less efficient thrust reverser and, as a consequence, the need for longer landing distances and increased wear on the aircraft's brakes.

SUMMARY

One embodiment includes a pivot thrust reverser. The pivot thrust reverser includes a first tandem pivot door subassembly comprising an inner panel and an outer panel. The inner panel and outer panel are connected by a first sliding rail. A second tandem pivot door subassembly is included comprising an inner panel and an outer panel. The inner panel and outer panel are connected by a second sliding rail.

Another embodiment includes a method for use with a gas turbine engine. A first tandem pivot door subassembly is provided comprising an inner panel and an outer panel. The inner panel and the outer panel of the first tandem pivot door subassembly are connected by a first sliding rail.

BRIEF DESCRIPTION OF THE DRAWINGS

FIG. 3 is an exploded perspective view of an inner panel and an outer panel of a tandem pivot door subassembly.

Figure 1A:
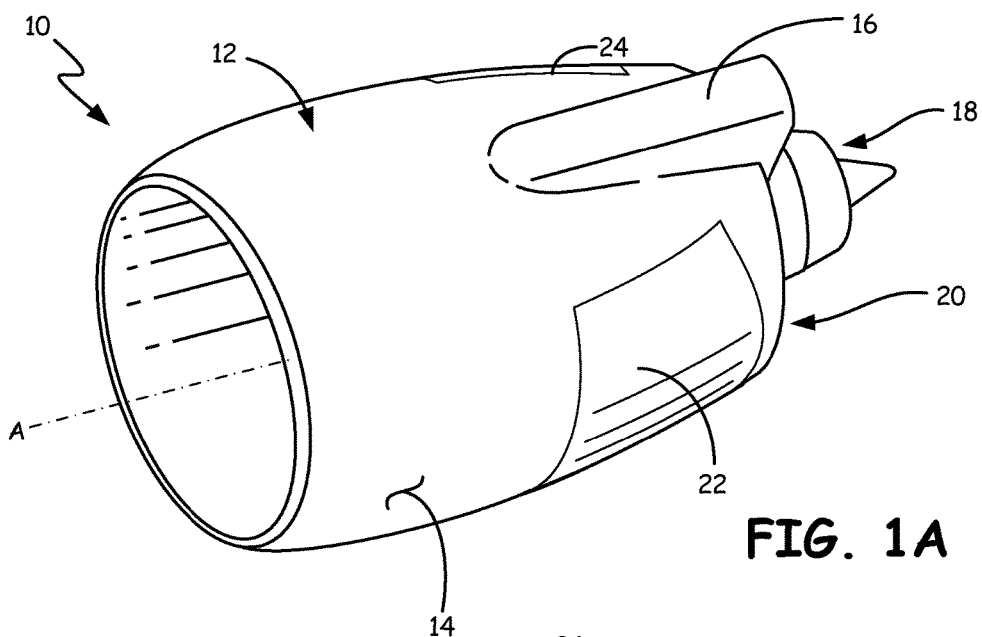
FIG. 1A is a perspective view of an embodiment of a gas turbine engine and nacelle assembly with a pivot thrust reverser according to the present invention, shown in a stowed position.

While the above-identified drawing figures set forth embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, a pivot thrust reverser can be deployed to circumferentially surround (or, synonymously, contour around) a portion of a gas turbine engine inner bypass duct wall such that a fan bypass stream is interrupted and redirected with relatively little leakage, while a core stream and a nacelle ventilation stream are unobstructed or substantially unobstructed. To avoid interference with the nacelle, the pivot thrust reverser uses a tandem pivot door subassembly with an inner panel and an outer panel that rotate simultaneously about different pivot points to allow the tandem pivot door subassembly to deploy and circumferentially surround the inner surface of the bypass duct. When stowed, the pivot thrust reverser tandem pivot door subassembly makes up a portion of both a surface of a bypass duct (e.g., an outer duct wall) and an outer surface of a nacelle. The thrust reverser tandem pivot door subassembly can be pivotally deployed from a stowed position to a deployed position by a single actuator on pivot axes that are positionally fixed relative to the gas turbine engine.

Figure 1B:
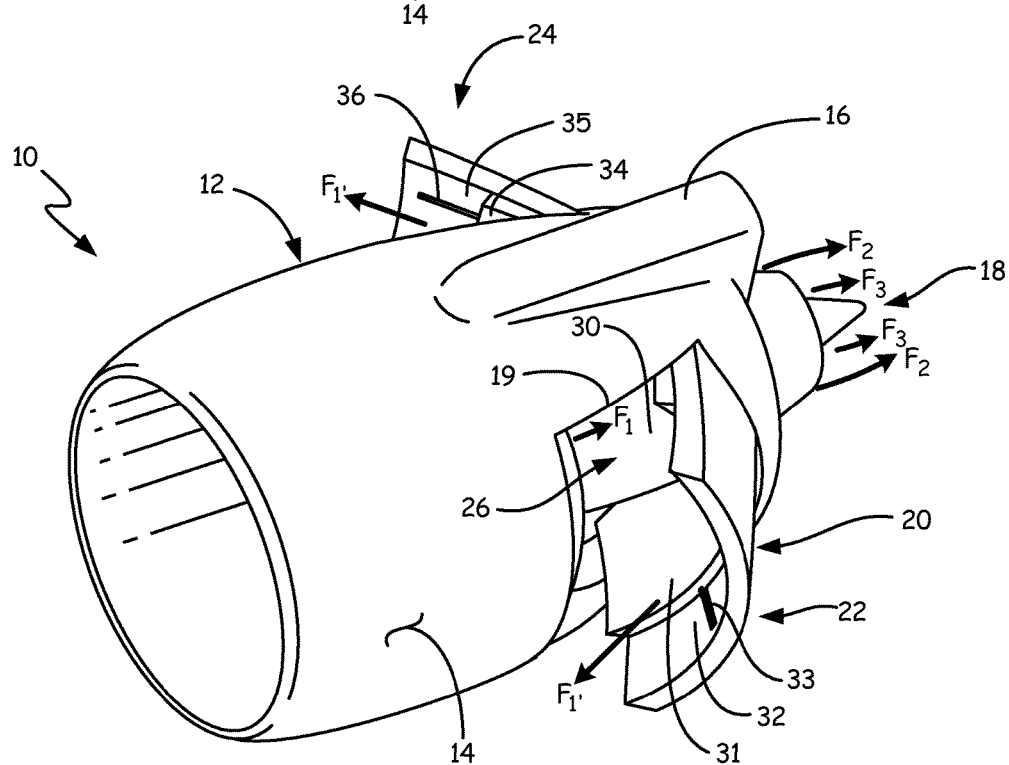
FIG. 1B is a perspective view of the gas turbine engine and nacelle assembly of FIG. 1A with the pivot thrust reverser shown in a deployed position.
Figure 1C:
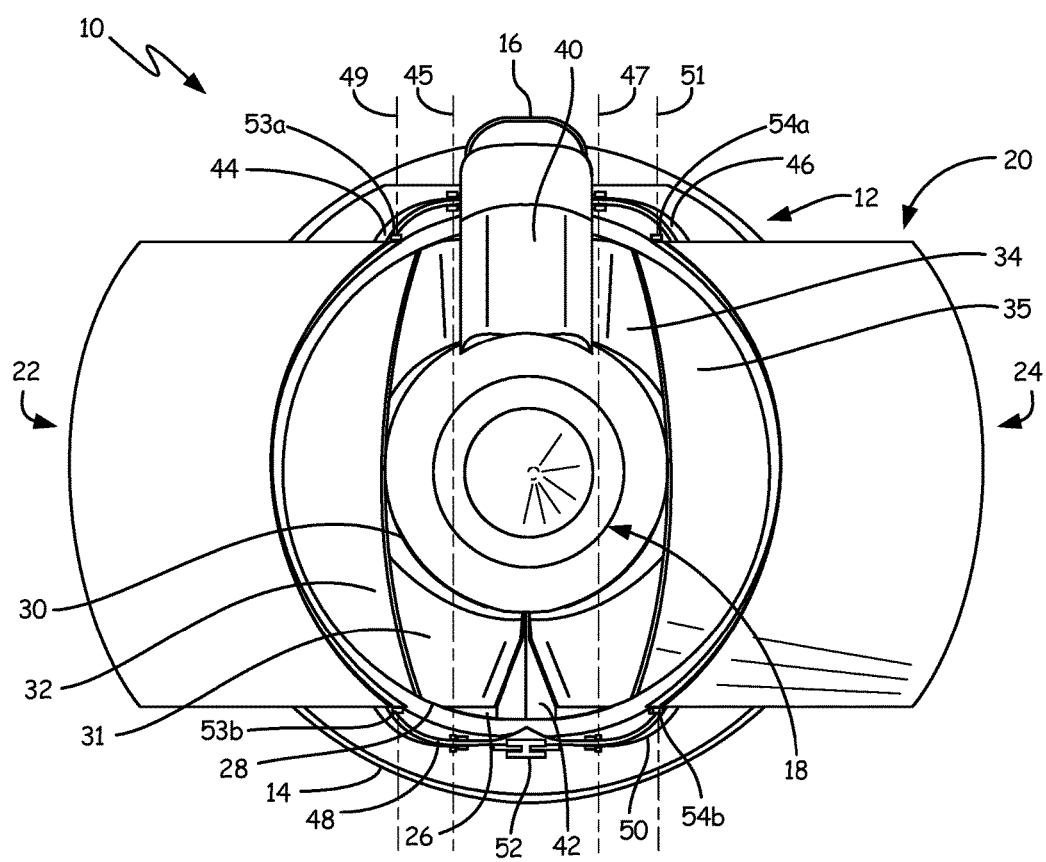
FIG. 1C is an aft elevation view of the gas turbine engine and nacelle of FIG. 1B with interior structures of the engine omitted.

FIGS. 1A, 1B, and 1C show an embodiment of gas turbine engine and nacelle assembly 10. FIG. 1A is a perspective view of assembly 10 with pivot thrust reverser 20 in the stowed position. FIG. 1B shows a perspective view of assembly 10 with pivot thrust reverser 20 in a deployed position. FIG. 1C is an aft elevation view of assembly 10 shown with pivot thrust reverser 20 in the deployed position. Assembly 10 includes nacelle 12, outer surface 14 of nacelle 12, pylon 16, engine 18, nacelle opening 19, pivot thrust reverser 20 with first tandem pivot door subassembly 22 and second tandem pivot door subassembly 24, bypass duct 26, outer surface 28 and inner surface 30 of bypass duct 26, inner panel 31 and outer panel 32 of first tandem pivot door subassembly 22, first sliding rail 33, inner panel 34 and outer panel 35 of second tandem pivot door subassembly 24, second sliding rail 36, upper bifurcation (bi-fi) fairing 40, lower bi-fi fairing 42, linkages 44 and 48 of first tandem pivot door subassembly 22, linkages 46 and 50 of second tandem pivot door subassembly 24, pivot axis 45 of inner panel 31, pivot axis 47 of inner panel 34, pivot axis 49 of outer panel 32, pivot axis 51 of outer panel 35, actuator 52, fixed pivot connection points 53a and 53b, fixed pivot connection points 54a and 54b, fan bypass stream $F_1$, redirected fan bypass stream $F_{1'}$, nacelle ventilation stream $F_2$, and core stream $F_3$. Certain components of assembly 10, such as a fan of engine 18, have been omitted for simplicity. Nacelle 12 provides an annular housing within which a substantial portion of engine 18 is located. Engine 18 is aligned on axis A of assembly 10 in the illustrated embodiment. Engine 18 includes a compressor section, a combustor section, and a turbine section (those sections not specifically shown), which in combination produce hot combustion gases that provide operational energy for engine 18. Pylon 16 provides a means for mounting assembly 10 to an aircraft (not shown). Pivot thrust reverser 20 includes both first tandem pivot door subassembly 22 and second tandem pivot door subassembly 24. As shown here, second tandem pivot door subassembly 24 is spaced approximately 180° from first tandem pivot door subassembly 22 relative to axis A of assembly 10.

When stowed, as shown in FIG. 1A, first tandem pivot door subassembly 22 and second tandem pivot door subassembly 24 each form a portion of outer surface 14, such that outer surface 14 is substantially smooth at all points along an exterior of nacelle 12, including interfaces with first tandem pivot door subassembly 22 and second tandem pivot door subassembly 24. Because first tandem pivot door subassembly 22 and second tandem pivot door subassembly 24 provide a smooth outer surface 14 of nacelle 12, pivot thrust reverser 20 tends to reduce a risk of undesired aerodynamic concerns.

Inner surface 30 of bypass duct 26 provides an outer surface of a wall covering engine 18. Bypass duct 26 is defined by the annular space within nacelle 12 between outer surface 30 and outer surface 28 of bypass duct 26. Outer surface 28 of bypass duct 26 is formed by both a duct wall at the interior of nacelle 12 and first tandem pivot door subassembly 22 and second tandem pivot door subassembly 24 when in the stowed position at opening 19, as was shown in FIG. 1A. Inner panel 31 and outer panel 32 of first tandem pivot door subassembly 22 are connected by parallel sliding rails (e.g., two sliding rails) in this embodiment. However only first sliding rail 33 is visible in FIG. 1B. Inner panel 34 and outer panel 35 of second tandem pivot door subassembly 24 are also connected by parallel sliding rails in this embodiment. However, only second sliding rail 36 is visible in FIG. 1B (the other sliding rails are visible in FIG. 2). In other embodiments, the connection between inner panels 31 and 34 and outer panels 32 and 35 can be made by a single sliding rail or more than two sliding rails, and the sliding rails can be located in places at interfaces between inner panels 31 and 34 and outer panels 32 and 35 as desired for particular applications.

Both first tandem pivot door subassembly 22 and second tandem pivot door subassembly 24 can pivot on respective pivot axes that are each positionally fixed relative to their respective mounting locations. Thus, first tandem pivot door subassembly 22 and second tandem pivot door subassembly 24 can merely pivot into the deployed position, without requiring any translation of portions of nacelle 12, first tandem pivot door subassembly 22, or second tandem pivot door subassembly 24 of assembly 10. Both first tandem pivot door subassembly 22 and second tandem pivot door subassembly 24 pivot into opening 19 so as to open upstream from an aft end of nacelle 12, such that first tandem pivot door subassembly 22 and second tandem pivot door subassembly 24 pivot open inside of nacelle 12, obstructing flow through bypass duct 26.

Fan bypass stream $F_1$ is relatively cold air which enters through the fan at the front end of nacelle 12 and passes through bypass duct 26. When pivot thrust reverser 20 is in the stowed position, fan bypass stream $F_1$ exits from an aft end of nacelle 12 and can provide a majority of the propulsion generated by high bypass gas turbine engine 18. However, when pivot thrust reverser 20 is in the deployed position, as shown in FIGS. 1B and 1C, first tandem pivot door subassembly 22 and second tandem pivot door subassembly 24 open inside of nacelle 12 and obstruct at least a portion of the flow of fan bypass stream $F_1$ through bypass duct 26, such that a redirected fan bypass stream $F_{1'}$ no longer exits from the aft end of nacelle 12, but is instead diverted in another direction. Redirected fan bypass stream $F_{1'}$ is redirected by deployed pivot thrust reverser 20 to flow in the forward, or upstream, direction shown in FIGS. 1B and 1C. Importantly, pivot thrust reverser 20 is configured such that there need not be any actuators, linkages, or other obstructions present in $F_{1'}$ flow path when pivot thrust reverser 20 is in the deployed position, which could otherwise obstruct the flow of redirected fan bypass stream $F_{1'}$ in the forward direction, thus reducing the effectiveness of pivot thrust reverser 20. Redirecting fan bypass stream $F_{1'}$ as shown can restrict or prevent fan bypass stream $F_1$ from providing forward propulsion, but can also actively provide deceleration. Yet, nacelle ventilation stream $F_2$ and core stream $F_3$, which flow through the inside of engine 18, can remain substantially unobstructed and continue to flow out downstream of engine 18 when pivot thrust reverser 20 is deployed in substantially the same manner as when pivot thrust reverser 20 is in the stowed position.

Additionally, in the illustrated embodiment, outer panel 32 is larger than inner panel 31 of first tandem pivot door subassembly 22 and outer panel 35 is larger than inner panel 34 of second tandem pivot door subassembly 24. By using larger outer panels 32 and 35, outer panels 32 and 35 not only provide structural support to inner panels 31 and 34 respectively, but also take on functional roles. Larger outer panels 32 and 35 provide additional guidance, in addition to the guidance provided by inner panels 31 and 34, for redirecting fan bypass stream $F_{1'}$ in the appropriate forward direction needed to provide deceleration. Consequently, by further guiding redirected fan bypass stream $F_{1'}$ in the forward direction, pivot thrust reverser 20 operates more effectively. Furthermore, larger outer panels 32 and 35 also can function as an air break, and thus provide deceleration in addition to that provided by redirected fan bypass stream $F_{1'}$.

Engine 18 is centered inside nacelle 12, in the illustrated embodiment, and thus is axially aligned with the engine fan at the front end of nacelle 12 (axis A of FIG. 1A). Upper bi-fi fairing 40 and lower bi-fi fairing 42 serve to interconnect nacelle 12 and engine 18, as well as provide additional stiffness for nacelle 12 and space for wires, tubes and other similar components.

In the illustrated embodiment, as best shown in FIG. 1C, linkage 44 provides a hinged connection between inner panel 31 (of first tandem pivot door subassembly 22) and pivot axis 45, with linkage 44 fixed to nacelle 12 at pivot axis 45. In the same manner, linkage 46 provides a hinged connection between inner panel 34 (of second tandem pivot door subassembly 24) and pivot axis 47, with linkage 46 fixed to nacelle 12 at pivot axis 47. Pivot axis 45 of inner panel 31 and pivot axis 47 of inner panel 34 can be positionally fixed relative to assembly 10, nacelle 12, and/or engine 18. Pivot axis 45 is spaced from inner panel 31 and extends from linkage 44 to linkage 48. Similarly, pivot axis 47 is spaced from inner panel 34 and extends from linkage 46 to linkage 50. Linkage 48 provides a connection between inner panel 31 and actuator 52, while linkage 50 provides a connection between inner panel 34 and actuator 52.

Outer panel 32 (of first tandem pivot door subassembly 22) is fixed to nacelle 12 at fixed pivot connection points 53a and 53b, and pivots about pivot axis 49. Points 53a and 53b provide hinge points for outer panel 32 and are located at or near a perimeter of outer panel 32 in nacelle 12, between outer surface 14 of nacelle 12 and outer surface 28 of bypass duct 26, on pivot axis 49. Outer panel 35 (of second tandem pivot door subassembly 24) is fixed to nacelle 12 at fixed pivot connection points 54a and 54b, and pivots about pivot axis 51. Points 54a and 54b provide hinge points for outer panel 35 and are located at or near a perimeter of outer panel 35 in nacelle 12, between outer surface 14 of nacelle 12 and outer surface 28 of bypass duct 26, on pivot axis 51. Pivot axis 49 of outer panel 32 and pivot axis 51 of outer panel 35 can each be positionally fixed relative to assembly 10, nacelle 12, and/or engine 18. Pivot axis 49 extends from point 53a to point 53b. Pivot axis 51 extends from point 54a to point 54b. As shown and discussed throughout, inner panels 31 and 34 maintain connection with outer panels 32 and 35 by sliding rails. As a result, inner panel 31 and outer panel 32 of first tandem pivot door subassembly 22 can pivot simultaneously about different pivot axes 45 and 49 without translating relative to those axes 45 and 49. Similarly, inner panel 34 and outer panel 35 of second tandem pivot door subassembly 24 can pivot simultaneously about different pivot axes 47 and 51 without translating.

Actuator 52 pivots both first tandem pivot door subassembly 22 and second tandem pivot door subassembly 24 from the stowed position to the deployed position without translation of first tandem pivot door subassembly 22, second tandem pivot door subassembly 24, or any portion of nacelle 12. In the deployed position shown in FIGS. 1B and 1C, first tandem pivot door subassembly 22 and second tandem pivot door subassembly 24 circumferentially surround a portion of inner surface 30 of bypass duct 26. Inner panel 31 of first tandem pivot door subassembly 22 and inner panel 34 of second tandem pivot door subassembly 24 are each configured to circumferentially surround inner surface 30 of bypass duct 26 such that an at least partially sealing, mating relationship is formed and there is relatively little leakage of fan bypass stream $F_1$ (the only leakage coming from portions where bypass duct 26 is visible). This means that nearly all of fan bypass stream $F_1$ is redirected, resulting in a highly efficient pivot thrust reverser 20. Yet, at the same time entire pivot thrust reverser 20 can be deployed by a single actuator 52, and therefore, provides a simplified design requiring minimal parts, and thus increases reliability and reduces maintenance costs.

Figure 2:
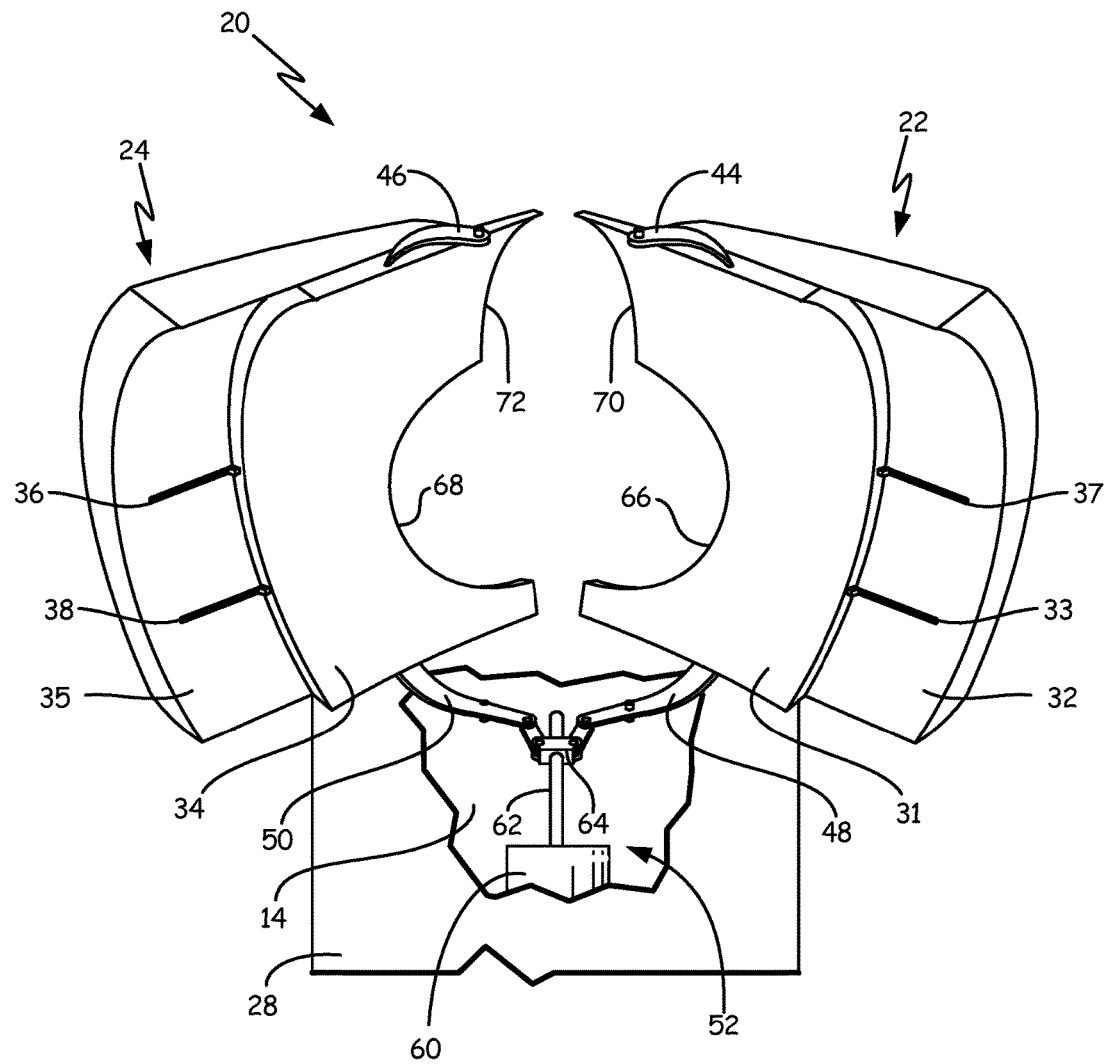
FIG. 2 is a perspective view of the pivot thrust reverser, with a single actuator, in the deployed position showing the inner panels connected to the outer panels by sliding rails.

FIG. 2 is a perspective view of pivot thrust reverser 20 with a single actuator 52 in a deployed position. Certain assembly 10 components are left out for simplicity. Included, in addition to that shown and described previously, are third sliding rail 37, fourth sliding rail 38, motor 60, threaded rod 62, threaded knucklehead 64, cutouts 66 and 68, and aft edges 70 and 72. Actuator 52 is located between outer surface 28 of bypass duct 26 and outer surface 14 of nacelle 12 (see also FIG. 1C). Actuator 52 can be, for example, a bolt screw linear actuator as shown here that includes motor 60, threaded rod 62, and threaded knucklehead 64. However, various other types of actuators can also be used in alternate embodiments to pivot both first tandem pivot door subassembly 22 and second tandem pivot door subassembly 24 between the stowed and deployed positions. Motor 60 moves threaded knucklehead 64 down threaded rod 62 towards motor 60, and in so doing, pivots inner panel 31 on pivot axis 45. Then, due to the connection between inner panel 31 and outer panel 32 by sliding rails 33 and 37, outer panel 32 is simultaneously made to pivot on pivot axis 49. At the same time, inner panel 34 is also pivoted on pivot axis 47, and due to the connection between inner panel 34 and outer panel 32 by sliding rails 36 and 38, outer panel 35 is simultaneously made to pivot on pivot axis 51. In this manner, first tandem pivot door subassembly 22 and second tandem pivot door subassembly 24 are pivoted by single actuator 52 about different pivot axes between stowed and deployed positions without translating (relative to assembly 10).

Additionally, inner panel 31 of first tandem pivot door subassembly 22 contains cutout 66 in aft edge 70 and inner panel 34 of second tandem pivot door subassembly 24 contains cutout 68 in aft edge 72. Both cutouts 66 and 68 are located on upper portions of aft edges 70 and 72 respectively. When in the deployed position, as shown here, aft edge 70 of inner panel 31 faces aft edge 72 of inner panel 34. As a result, cutout 66 is aligned to face cutout 68 when tandem pivot door subassemblies 22 and 24 are deployed, forming an opening in pivot thrust reverser 20 to accommodate engine 18. Both cutout 66 and cutout 68 can be arc-shaped, resulting in the opening in pivot thrust reverser 20 being generally circular in shape. However, in alternative embodiments, cutouts 66 and 68 can have various different shapes and be placed at any location on inner panels 31 and 34.

FIG. 3 is an exploded perspective view of inner panel 31 and outer panel 32 of first tandem pivot door subassembly 22. Included, in addition to that shown and described previously, are inward-facing protrusion 67 and side protrusion 69 on outer panel 32. Inner panel 31 is placed on top of outer panel 32 with the connection made by sliding rails 33 and 37. In this embodiment, inward-facing protrusion 67 is of a shape complimentary with cutout 66 in aft edge 70 of inner panel 31, such that inward-facing protrusion 67 protrudes into the location of cutout 66 when inner panel 31 is placed on top of outer panel 32. Also, side protrusion 69 is of a shape complimentary with curved aft edge 70 of inner panel 31, such that side protrusion 69 protrudes up from an interface of aft edge 70 and side protrusion 69. Protrusions 67 and 69 then allow first tandem pivot door subassembly 22 to both provide a substantially smooth outer surface 28 of bypass duct 26 and a complete outer surface 14 of nacelle 12 when first tandem pivot door subassembly 22 is stowed. Consequently, fan bypass stream $F_1$ experience relatively little turbulence when passing through bypass duct 26 at the location where outer surface 28 of bypass duct 26 is formed by stowed first tandem pivot door subassembly 22. This allows assembly 10 to produce efficient and effective propulsion even with pivot thrust reverser 20 included.

Figure 4A:
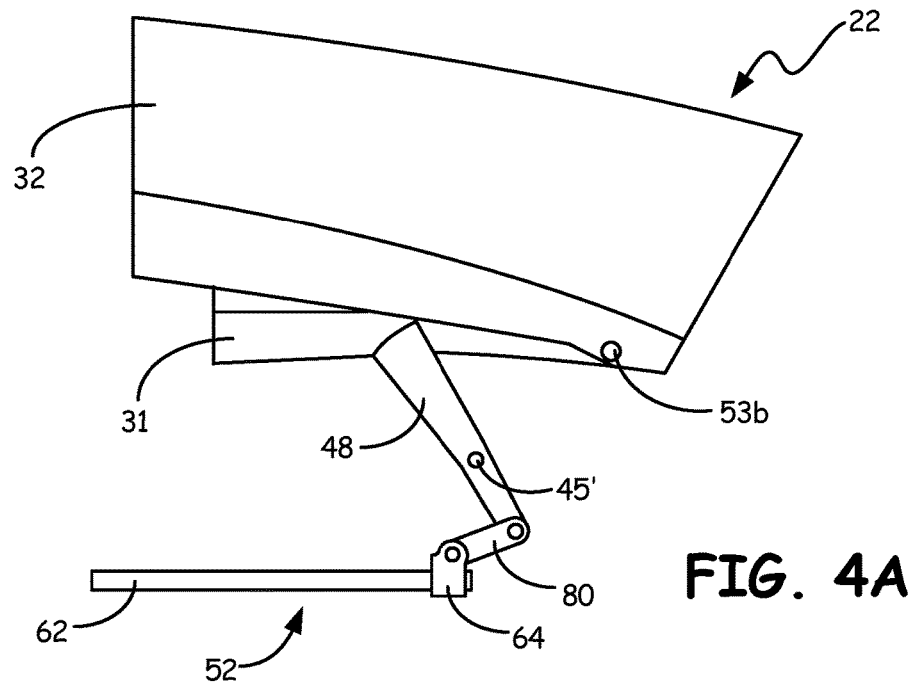
FIG. 4A is a plan view of the actuator and tandem pivot door subassembly, shown in isolation, in the stowed position.
Figure 4B:
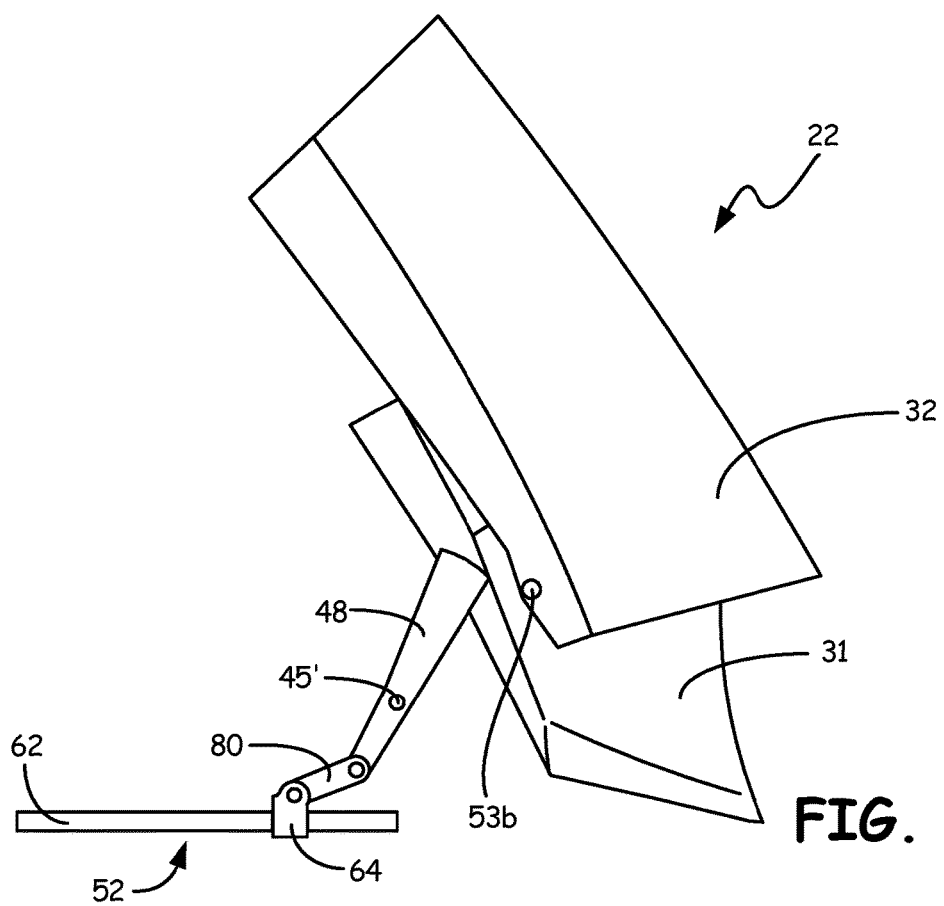
FIG. 4B is a plan view of the actuator and tandem pivot door subassembly, shown in isolation, in the deployed position.

FIGS. 4A and 4B show a plan view of actuator 52 and first tandem pivot door subassembly 22 in isolation, with first tandem pivot door subassembly 22 pivoted from the stowed to the deployed position. FIG. 4A shows first tandem pivot door subassembly 22 in the stowed position. FIG. 4B shows first tandem pivot door subassembly 22 pivoted to the deployed position. Included, in addition to that shown and described previously, are fixed pivot point 45' and link 80. Fixed pivot point 45' is located on pivot axis 45 (shown in FIG. 1C) and is a pivot connection point about which inner panel 31 rotates. Point 53b, as discussed for FIG. 1C, is located on pivot axis 49, and is a pivot connection point about which outer panel 32 is hinged to nacelle 12 and pivotally rotates. In this embodiment, point 53b is located at or near a perimeter of outer panel 32, and more specifically is at or near an aft end of outer panel 32 which can pivot inside of nacelle 12. Link 80 provides a connection between threaded knucklehead 64 of actuator 52 and linkage 48.

As first tandem pivot door subassembly 22 is pivoted to the deployed position, threaded knucklehead 64 moves down threaded rod 62. This forces inner panel 31 to pivot about pivot axis 45 on point 45', and in turn, due to the connection between inner panel 31 and outer panel 32, forces outer panel 32 to pivot about pivot axis 49 on point 53b. Outer panel 32 stops in the position shown in FIG. 4B and does not move further along sliding rails 33 and 37 due to point 53b being fixed to nacelle 12. Therefore, first tandem pivot door subassembly 22 is deployed by pivoting inner panel 31 and outer panel 32 simultaneously about different pivot points. This allows first tandem pivot door subassembly 22 to deploy and avoid interference from nacelle 12 that otherwise would occur due to the location of first tandem pivot door subassembly 22.

Figure 5A:
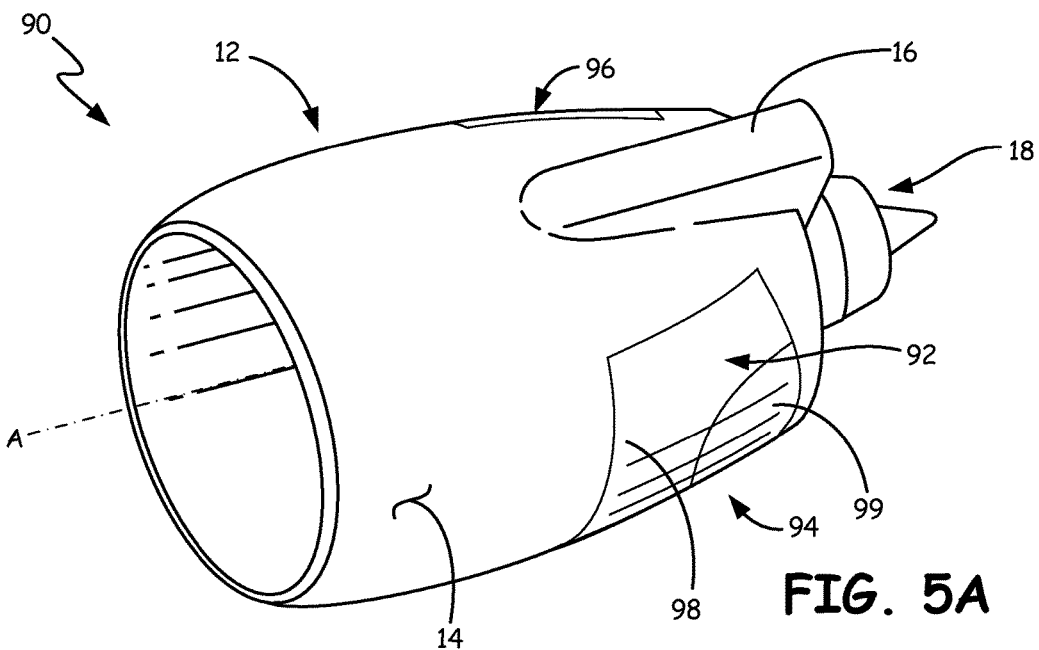
FIG. 5A is a perspective view of a gas turbine engine and nacelle assembly with another embodiment of a pivot thrust reverser according to the present invention, shown in a stowed position.
Figure 5B:
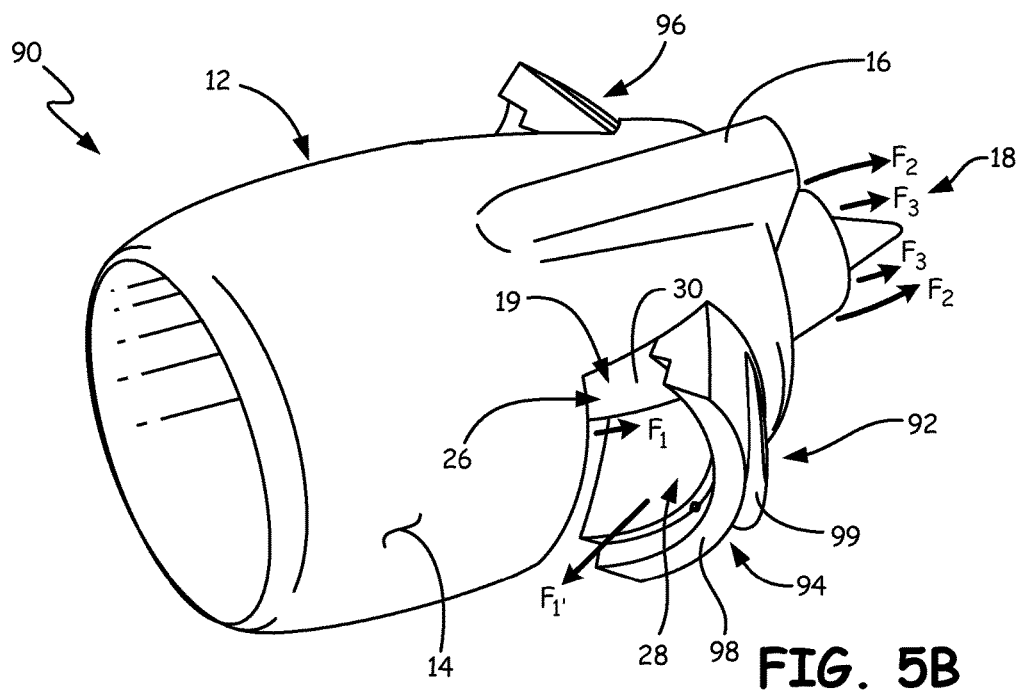
FIG. 5B is a perspective view of the gas turbine engine and nacelle assembly of FIG. 5A with the pivot thrust reverser shown in a deployed position.

FIGS. 5A and 5B show a perspective view of an embodiment of gas turbine engine and nacelle assembly 90 with another embodiment of pivot thrust reverser 92. FIG. 5A shows pivot thrust reverser 92 in a stowed position, and FIG. 5B shows pivot thrust reverser 92 in a deployed position. Assembly 90 includes, in addition to that shown and described previously, pivot thrust reverser 92 with first tandem pivot door subassembly 94 and second tandem pivot door subassembly 96, inner panel 98 and outer panel 99 of first tandem pivot door subassembly 94 (second tandem pivot door subassembly 96 also has inner and outer panels, but are not visible in these FIGS.). Outer panel 99 is connected to inner panel 98 by sliding rails, detailed previously. Pivot thrust reverser 92 differs from pivot thrust reverser 20 shown previously in that inner panel 98 is larger than outer panel 99. Here, outer panel 99 serves to prevent interference with nacelle 12 and form both a complete outer surface 14 of nacelle 12 at opening 19 and outer surface 28 of bypass duct 26. Inner panel 98 when stowed also forms both a portion of outer surface 14 of nacelle 12 at opening 19 and outer surface 28 of bypass duct 26. Inner panel 98 and outer panel 99 are flush relative to each other when stowed. Outer panel 99 can be both shorter in length and width than inner panel 98. Also, outer panel 99 can have a curved forward end when inner panel 98 contains a cutout at an aft edge so as to provide a substantially gap free outer surface 14 of nacelle 12 at opening 19 and outer surface 28 of bypass duct 26.

The present embodiments provide a highly effective thrust reverser for use in a gas turbine engine. This is because configuring inner panels 31 and 34 with cutouts 66 and 68 to surround inner surface 30 of bypass duct 26 as shown allows nearly all of fan bypass stream $F_1$ to be redirected in the appropriate direction, while at the same time minimizing the number of components needed to pivot both first and second tandem pivot door subassemblies 22 and 24 from the stowed to the deployed position without interference from nacelle 12. This is turn decreases the weight of thrust reverser 20 while increasing the reliability of thrust reverser 20. Additionally, the design of thrust reverser 20 provides a modular assembly which allows for direct mounting of thrust reverser 20 in position.

Discussion of Possible Embodiments

The following are non-exclusive descriptions of possible embodiments of the present invention.

A pivot thrust reverser comprising a first tandem pivot door subassembly comprising an inner panel and an outer panel wherein the inner panel and the outer panel are connected by a first sliding rail; and a second tandem pivot door subassembly comprising an inner panel and an outer panel, wherein the inner panel and the outer panel are connected by a second sliding rail.

The pivot thrust reverser of the preceding paragraph can optionally include, additionally and/or alternatively, any one or more of the following features, configurations, and/or additional components:

The inner panel and the outer panel of the first tandem pivot door subassembly are configured to rotate simultaneously about different pivot points, and wherein the inner panel and the outer panel of the second tandem pivot door subassembly are configured to rotate simultaneously about different pivot points.

An actuator configured to pivot both the first tandem pivot door subassembly and the second tandem pivot door subassembly from a stowed position to a deployed position on respective pivot points that are each positionally fixed relative to a mounting location.

A pivot point of the inner panel of the first tandem pivot door subassembly is located on an arm operatively connected between an actuator and the inner panel of the first tandem pivot door subassembly, and wherein the pivot point of the outer panel of the first tandem pivot door subassembly is located at or near a perimeter of the outer panel of the first tandem pivot door subassembly.

The actuator is located between a surface of a bypass duct and an outer surface of a nacelle.

The inner panel of the first tandem pivot door subassembly is larger than the outer panel of the first tandem pivot door subassembly.

The outer panel of the first tandem pivot door subassembly is larger than the inner panel of the first tandem pivot door subassembly.

The first tandem pivot door subassembly forms both a portion of a surface of a bypass duct and a portion of an outer surface of a nacelle when in a stowed position.

The inner panel and the outer panel of the first tandem pivot door subassembly are connected by a third sliding rail.

A first cutout on the first tandem pivot door subassembly inner panel.

An inward-facing protrusion on the first tandem pivot door subassembly outer panel, wherein the inward-facing protrusion is of a shape complimentary with the first cutout.

A second cutout on the second tandem pivot door subassembly inner panel.

Both the first cutout and the second cutout are each arc-shaped.

A method for reversing thrust of a gas turbine engine, the method comprising providing a first tandem pivot door subassembly comprising an inner panel and an outer panel; and connecting the inner panel and the outer panel of the first tandem pivot door subassembly are by a first sliding rail.

The method of the preceding paragraph can optionally include, additionally and/or alternatively, the following techniques, steps, features and/or configurations:

Rotating the inner panel and the outer panel simultaneously about different pivot axes.

Pivotally deploying the first tandem pivot door subassembly from a stowed position to a deployed position by an actuator, wherein the inner and outer panels are pivotally deployed by the actuator on respective pivot points each positionally fixed relative to the gas turbine engine.

Providing a second tandem pivot door subassembly spaced from the first tandem pivot door subassembly comprising an inner panel and an outer panel; and connecting the inner panel and the outer panel of the second tandem pivot door subassembly by a second sliding rail, wherein the inner panel and the outer panel rotate simultaneously about different pivot points.

The inner panel and the outer panel of the first tandem pivot door subassembly are connected by a third sliding rail.

Circumferentially surrounding a portion of an inner surface of a bypass duct with the first tandem pivot door subassembly and the second tandem pivot door subassembly when the first tandem pivot door subassembly and the second tandem pivot door subassembly are in the deployed position; and redirecting a fan bypass stream during engine operation when the first tandem pivot door subassembly and the second tandem pivot door subassembly are in the deployed position.

Locating the first tandem pivot door subassembly in a location such that the first tandem pivot door subassembly forms both a portion of a surface of a bypass duct and a portion of an outer surface of a nacelle when in the stowed position; and locating the second tandem pivot door subassembly in a location such that the second tandem pivot door subassembly forms both a portion of the surface of the bypass duct and a portion of the outer surface of the nacelle when in the stowed position.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for use with a gas turbine engine, the method comprising:
    providing a first tandem pivot door subassembly comprising a first inner panel and a first outer panel;
    connecting the first inner panel and the first outer panel of the first tandem pivot door subassembly by a first sliding rail with the first inner panel and the first outer panel configured to rotate simultaneously about different pivot axes;
    providing a second tandem pivot door subassembly comprising a second inner panel and a second outer panel;
    connecting the second inner panel and the second outer panel of the second tandem pivot door subassembly by a second sliding rail with the second inner panel and the second outer panel configured to rotate simultaneously about different pivot axes; and
    pivoting by an actuator both the first tandem pivot door subassembly and the second tandem pivot door subassembly from a stowed position to a deployed position on respective pivot axes that are each positionally fixed relative to a mounting location with the pivot point of the first inner panel being located on a linkage operatively connected between the actuator and the first inner panel.

2. The method of claim 1, wherein the first inner panel and the second outer panel of the first tandem pivot door subassembly are connected by a third sliding rail.

3. The method of claim 1, further comprising:
    circumferentially surrounding a portion of an inner surface of a bypass duct with the first tandem pivot door subassembly and the second tandem pivot door subassembly when the first tandem pivot door subassembly and the second tandem pivot door subassembly are in the deployed position; and
    redirecting a fan bypass stream during engine operation when the first tandem pivot door subassembly and the second tandem pivot door subassembly are in the deployed position.

4. The method of claim 3, further comprising:
    locating the first tandem pivot door subassembly in a location such that the first tandem pivot subassembly forms both a portion of a surface of a bypass duct and a portion of an outer surface of a nacelle when in the stowed position; and
locating the second tandem pivot door subassembly in a location such that the second tandem pivot door subassembly forms both a portion of the surface of the bypass duct and a portion of the outer surface of the nacelle when in the stowed position.

\* \* \* \* \*